(12) United States Patent
Maresca

(10) Patent No.: US 6,263,035 B1
(45) Date of Patent: Jul. 17, 2001

(54) SYSTEM AND METHOD FOR ADJUSTING A PHASE ANGLE OF A RECOVERED DATA CLOCK SIGNAL FROM A RECEIVED DATA SIGNAL

(75) Inventor: Patrick A. Maresca, Dunwoody, GA (US)

(73) Assignee: Oki Telecom, Inc., Suwanee, GA (US)

( * ) Notice: Subject to any disclaimer, the term of this patent is extended or adjusted under 35 U.S.C. 154(b) by 0 days.

(21) Appl. No.: 09/050,776

(22) Filed: Mar. 30, 1998

Related U.S. Application Data

(60) Provisional application No. 60/073,465, filed on Feb. 2, 1998.

(51) Int. Cl.⁷ .................................................. H04L 7/00
(52) U.S. Cl. ......................... 375/371; 375/360; 375/361; 375/373; 375/376
(58) Field of Search ...................... 375/355, 360, 375/361, 359, 371, 330, 373, 376

(56) References Cited

U.S. PATENT DOCUMENTS

| | | | |
|---|---|---|---|
| 4,048,582 | 9/1977 | Ihara | 331/16 |
| 4,369,516 | 1/1983 | Byrns | 375/110 |
| 4,756,011 * | 7/1988 | Cordell | 375/371 |
| 4,847,869 | 7/1989 | Labedz et al. | 375/85 |
| 4,965,533 | 10/1990 | Gilmore | 331/18 |
| 5,028,887 | 7/1991 | Gilmore | 331/18 |
| 5,105,447 * | 4/1992 | Iwane | 375/360 |
| 5,142,247 | 8/1992 | Lada, Jr. et al. | 331/14 |
| 5,233,314 | 8/1993 | McDermott et al. | 331/17 |
| 5,259,003 | 11/1993 | Berger et al. | 375/38 |
| 5,259,007 | 11/1993 | Yamamoto | 375/120 |
| 5,347,232 | 9/1994 | Nishimichi | 331/1 |
| 5,428,631 | 6/1995 | Zehavi | 371/43 |
| 5,488,332 | 1/1996 | DeLoe, Jr. | 331/25 |
| 5,499,280 | 3/1996 | Wilson et al. | 377/108 |
| 5,539,783 * | 7/1996 | Papson | 375/355 |
| 5,559,841 * | 9/1996 | Pandula | 375/375 |
| 5,602,513 | 2/1997 | DeLoe, Jr. | 331/25 |
| 5,642,386 * | 6/1997 | Rocco, Jr. | 375/355 |
| 5,717,728 * | 2/1998 | Hein et al. | 375/355 |
| 5,757,767 | 5/1998 | Zehavi | 370/208 |
| 5,761,254 * | 6/1998 | Behrin | 375/355 |
| 5,790,611 * | 8/1998 | Huang et al. | 375/371 |
| 5,864,250 * | 1/1999 | Deng | 327/165 |
| 5,892,803 * | 4/1999 | Saunders et al. | 375/355 |
| 5,974,097 * | 10/1999 | Julyan et al. | 375/340 |
| 6,044,122 * | 3/2000 | Ellersick et al. | 375/360 |

OTHER PUBLICATIONS

Hideaki Okamoto and Takaaki Hasegawa, Delay–Lock Phase–Locked Tracking of PN Signals (DPTL), 1992 IEEE, Singapore ICCS/ISITA '92, pp. 305–308.

Exar Corporation, *DATABOOK*, Apr., 1986, pp. 38–52.

\* cited by examiner

*Primary Examiner*—Stephen Chin
*Assistant Examiner*—Shuwang Liu
(74) *Attorney, Agent, or Firm*—Thomas, Kayden, Horstemeyer & Risley, LLP

(57) ABSTRACT

A system for adjusting a phase angle of a recovered data clock signal from a received data signal includes a plurality of counters and a phase state machine. Each counter within the plurality of counters determines a number of samples having a logical one (1) value within a particular portion of a period of the received data signal. Each counter then compares the number to a predetermined threshold value. Each counter transmits a signal indicating whether the number of samples having a logical one (1) for each portion of received data signal's period is greater than, is less than, or is equal to the predetermined threshold. The phase state machine receives the signals transmitted by each counter and adjusts the phase angle of the recovered data clock signal based on the signals received from each counter.

18 Claims, 7 Drawing Sheets

SYSTEM AND METHOD FOR ADJUSTING A PHASE ANGLE OF A RECOVERED DATA CLOCK SIGNAL FROM A RECEIVED DATA SIGNAL

CROSS-REFERENCE TO RELATED APPLICATION

This application claims priority under 35 U.S.C. § 119 to U.S. Provisional Patent Application Serial No. 60/073,465, filed Feb. 2, 1998.

BACKGROUND OF THE INVENTION

The present invention relates generally to the field of wireless communications, and more specifically to the field of adjusting a phase angle of a recovered data clock signal from a data signal.

In wireless communications, data signals are transmitted over the air in an analog format, typically encoded in such a manner that clocking information for the data is embedded into the data signals and is transmitted along with the data. A typical encoding scheme used is Manchester Encoding where a data transmission clock, operating at twice the frequency of the data signal's clock, is embedded into the data signal. The use of Manchester Encoding inserts a data transmission clock transition into the middle of each data signal period and thus allows the recovery of the transmission clock by processing the received data stream.

One method for recovering the transmission clock in a Manchester Encoded data sequence is to attempt to detect the clock transition in the middle of every data signal bit. This can be problematic due to the fact that depending on a particular bit pattern, each single data signal bit may possess two data transmission clock edge transitions. Also due to noise which is often injected onto the transmitted data signal, the clock transition may not be present in every data signal bit. Additionally, the transmission clock transition may not be sharp enough for the clock edge detection circuitry to detect the transition, or it may be too sharp of a transition and the clock edge detection circuitry cannot detect the transition. Hence clock recovery methods based on the detection of the transition of the clock transition are problematic, depending greatly on the quality of the received signal.

Another digital transmission clock recovery technique includes detecting the presence of a synchronization bit that is used to initial a data signal bit and detecting when the maximum intra-bit signaling distance has been exceeded. This method however, requires the addition of at least one synchronization bit, hence reducing data transmission throughput and increasing circuit complexity.

There is, therefore, a need in the industry for a system addressing these and other related and unrelated problems.

SUMMARY OF THE INVENTION

The present invention provides a system for adjusting the timing and phase angle of a recovered data clock signal from a received data signal includes a plurality of counters and a phase state machine. Each counter within the plurality of counters determines a number of samples having a logical one (1) value within a particular portion of a period of the received data signal. Each counter then compares the number to a predetermined threshold value. Each counter transmits a signal indicating whether the number of samples having a logical one (1) for each portion of received data signal's period is greater than, is less than, or is equal to the predetermined threshold. The phase state machine receives the signals transmitted by each counter and adjusts the phase angle of the recovered data clock signal based on the signals received from each counter.

According to the first preferred embodiment of the present invention, the first counter counts digitally sampled data samples within a center portion of the data period of the received data signal.

According to the first preferred embodiment of the present invention, the second counter counts digitally sampled data samples within a portion of the data period having samples detected prior to the center portion samples.

According to the first preferred embodiment of the present invention, the third counter counts digitally sampled data samples within a portion of the data period having samples detected after the center portion samples According to the first preferred embodiment of the present invention, the effective counting windows of the second and the third counters can be slightly overlapped, around the expected location of the transmission clock transition, ensuring if one counter counts the transition, the other counter will also count the transition.

According to the second preferred embodiment of the present invention. the effective counting windows of the second and third counter are not overlapped.

Thus, the present invention provides a method for digitally detecting the transmission data clock edge transmission and to allow for adjustments to accurately track the transmission clock. The present invention provides a method for digitally detecting the transmission data clock edge which does not depend on the actual detection of the clock edge transition, which can be difficult to detect.

Objects features, and advantages of the present invention will become apparent upon reading and understanding the present specifications, when taken in conjunction with accompanying drawings.

DESCRIPTION OF THE PREFERRED EMBODIMENTS

Figure 1:
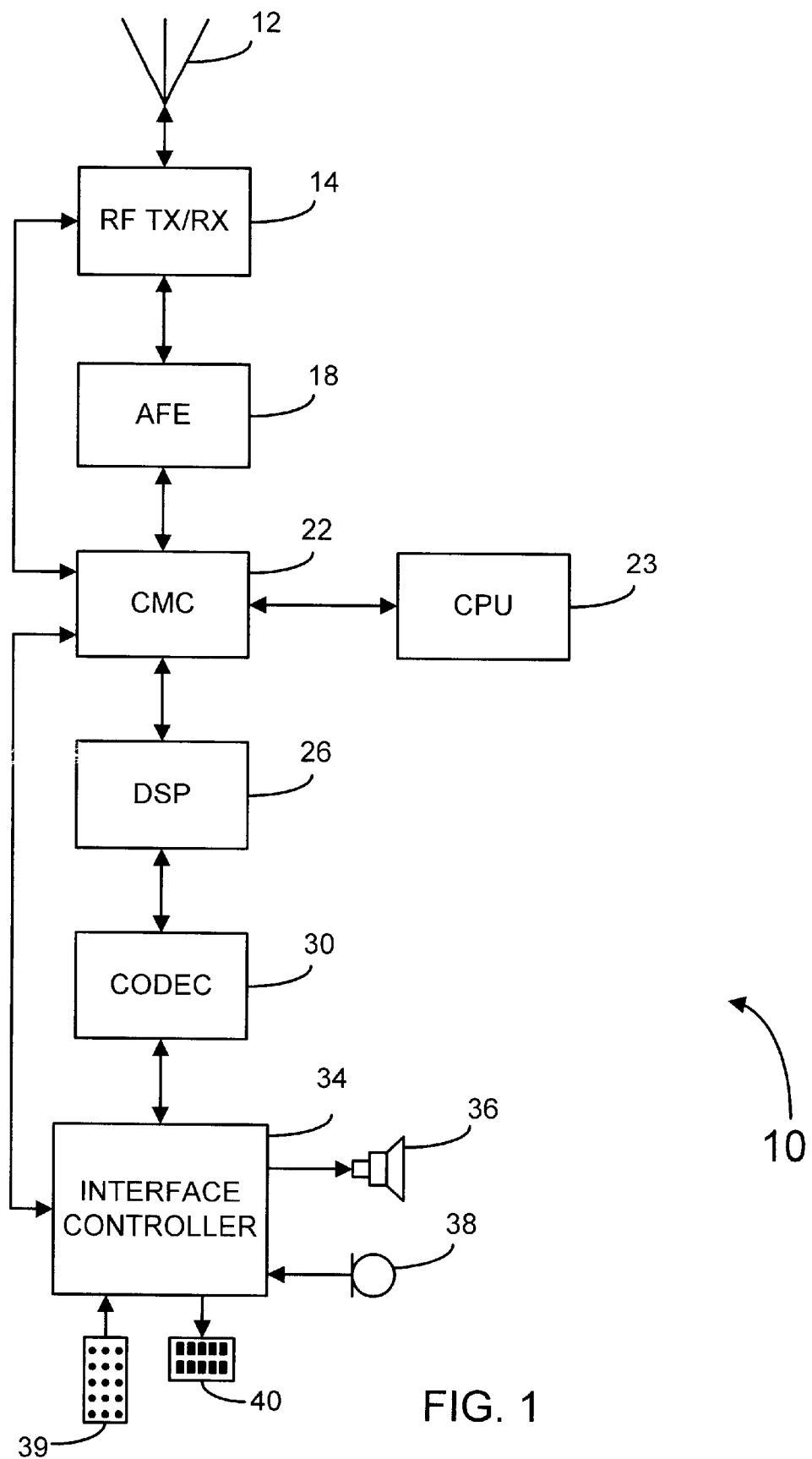
FIG. 1 is a block diagram representation of a CDMA wireless telephone, in accordance with the first preferred embodiment of the present invention.

Refer now to greater detail to the drawings in which like numerals represent like components throughout several views. FIG. 1 shows a block diagram of a dual mode wireless telephone 10, capable of operating in both digital and analog modes, in accordance with a first preferred embodiment of the present invention. The diagram additionally applies to a variety of wireless telephones of alternate embodiments of the present invention, including dual mode cellular and personal communications systems (PCS) telephones. While the wireless telephone 10 is capable of operating in both digital and analog modes, the following description will describe the wireless telephone 10 as it operates in analog mode.

According to the first preferred embodiment of the present invention, radio signals are received through an antenna 12 and then filtered, mixed to lower frequencies, automatic gain controlled frequency modulation (FM) demodulated in a radio frequency transmit/receive (RF TX/RX) circuit 14 before being converted, in an analog front end (AFE) circuit 18, from analog to digital and supplied to a CDMA modem circuit (CMC) 22. As controlled by a central processing unit (CPU) 23, the CMC 22 demodulates the incoming digital data stream and transmits the data to a digital signal processor (DSP) 26 where the digital data is Viterbi and digitally speech decoded before being decoded into an audio signal by coder/decoder (CODEC) 30. The decoded audio signal is controllably amplified by an interface controller 34 and output through a telephone speaker 36. Likewise, a reverse path is followed through the wireless telephone 10 as a telephone microphone 38 detects user speech. A keypad 39 and a display 40 provide conventional user input and output.

Figure 2:
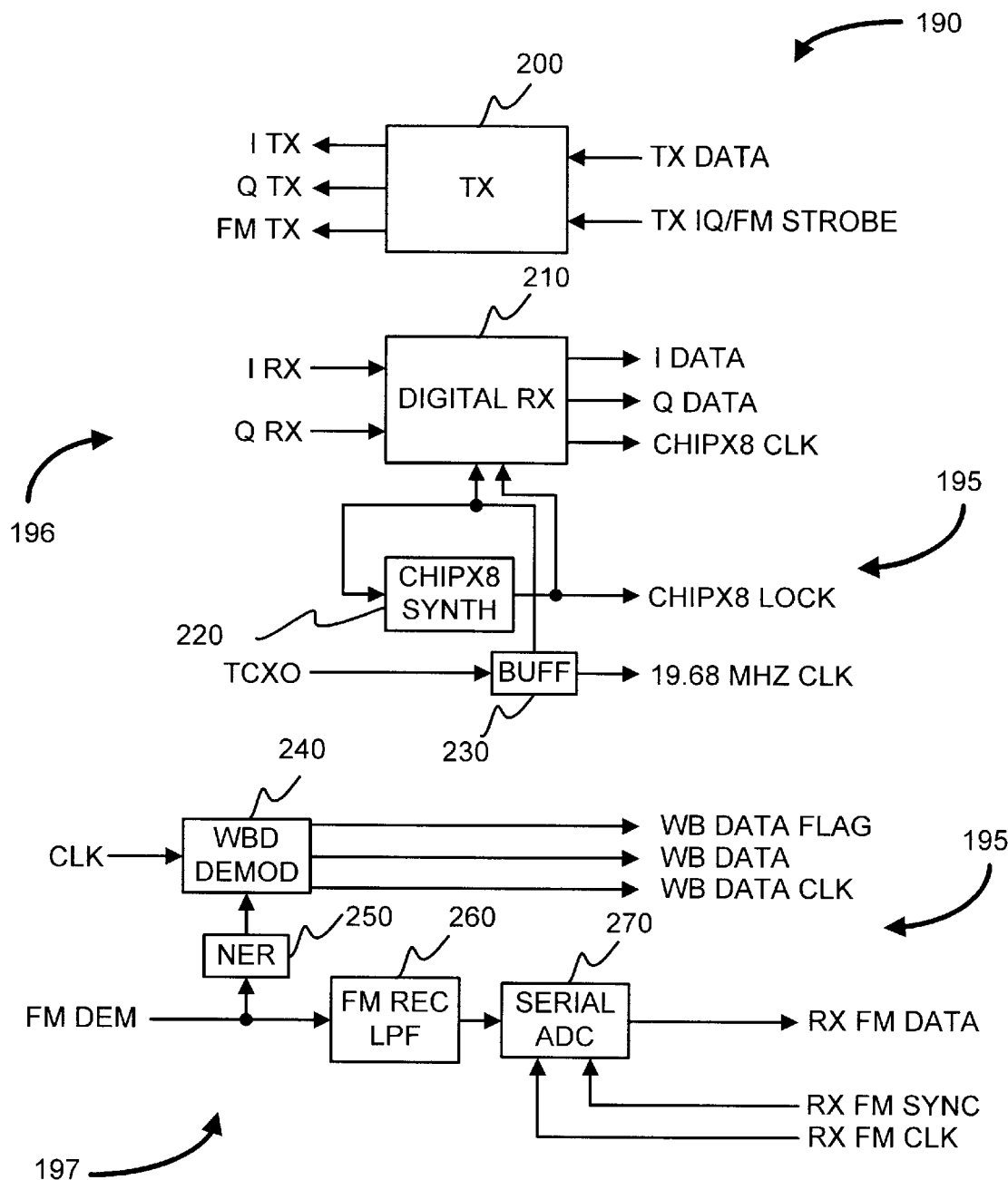
FIG. 2 is a block diagram representation of an analog front end (AFE) circuit of FIG. 1, in accordance with the first preferred embodiment of the present invention.

Refer now to FIG. 2 which shows a block diagram of the analog front end (AFE) circuit 18 of FIG. 1. The organization of the AFE 18 is divided into three sections: a transmit section 190, a receive section 195, and an auxiliary section (not shown). The auxiliary section provides basic housekeeping functionality. generates error and control flats based on the data being processed by the AFE 18, possesses power supply and control circuits, and controls the overall functions of the AFE 18.

The transmit section 190 is responsible for performing the transformations required to prepare the output signals for transmission. The transmit section 190 can operate with both analog and digital signals, depending on the operating mode of the wireless telephone 10 (FIG. 1) he transmit section 190 includes several low pass filters (LPF) (not shown), a data latch (not shown), several buffers (not shown), and several digital to analog converters (DAC) (not shown) in a transmitter 200. Inputs to the transmitter 200 include a transmit data stream (TX DATIA) and a transmit strobe (TX IQ/FM STROBE). The TX IQ/FM STROBE is used to provide a clock for the DACs (not shown) and the data latch (not shown) in the transmitter 200 After the analog TX DATA has been converted to digital TX DATA by the DACs (not shown) in the transmitter 200, the digital TX DATA is passed through a LPF (not shown) and then to the RF TX/RX 14 (FIG. 1) and the antenna 12 (FIG. 1).

The receive section 195 of the AFE 18 is divided into a digital section 196 and an analog section 197. The digital section 196 is responsible for converting the received digital signals into a form that is suitable for processing by the CMC 22 (FIG. 1) and is not discussed herein. The analog section 197 takes demodulated analog signals (FM )DEM) from the RF TX/RX 14 (FIG. 1) and decodes the voice data signal and the wideband data signal. Wideband data signals are control data intended for the wireless telephone 10 (FIG. 1) which are transmitted to the wireless telephone 10 (FIG. 1) along with the voice data signal when the wireless telephone 10 (FIG. 1) is operating in analog mode. Inputs to the analog section 197 includes FM DEM from the RF TX/RX 14 circuit (FIG. 1) and RX FM SYNC and RX FM CLK, both from the CMC 22 (FIG. 1) of the wireless telephone 10 (FIG. 1). The RX FM SYNC is used as an input strobe signal to initiate a serial analog to digital converter (ADC) 270 conversion cycle. The RX FM CLK is used as an input clock signal to clock FM received data out of the serial ADC 270.

As the FM DEM signal enters the analog section 197, the signal is separated into two different signal streams, the voice data signal and the wideband data signal streams. The voice data signal goes to the voice signal section and the wideband data signal goes to the wideband data demodulator section. The voice data signal going to the voice signal section is simply filtered by a low pass filter 260 and then converted to a digital signal by the serial ADC 270. As controlled by the RX FM SYNC signal the output of the serial ADC 270 is transmitted to the CMC 22 (FIG. 1) for further processing of the voice data signal.

The wideband data signal as it enters the wideband demodulator section is converted to its digital representation. In the digital conversion process, noise and errors injected into the wideband data signal during the transmission and reception process is removed. Noise and errors introduced into the wideband data signal is removed by a noise and error removal (NER) circuit 250. After any noise and errors are removed and the analog wideband data signal converted to digital, the digital wideband data signal enters a wideband data demodulator 240. The wideband data demodulator 240 processes the digital wideband data signal and produces as output processed wideband data (WB DATA), a wideband data flag (WB DATA FLAG) concerning the validity of the WB DATA, and a wideband data clock (WB DATA CLK). The WB DATA is the actual wideband data that was transmitted along side the voice data signal. The WB DATA FLAG is a flag that specifics if the WB DATA is valid and the WB DATA CLK provides timings information regarding the data boundaries of the WB DATA. The WB DATA FLAG and the WB DATA CLK are actually venerated in the wideband data demodulator 240 (FIG. 2) prom the encoded wideband data stream.

Figure 3:
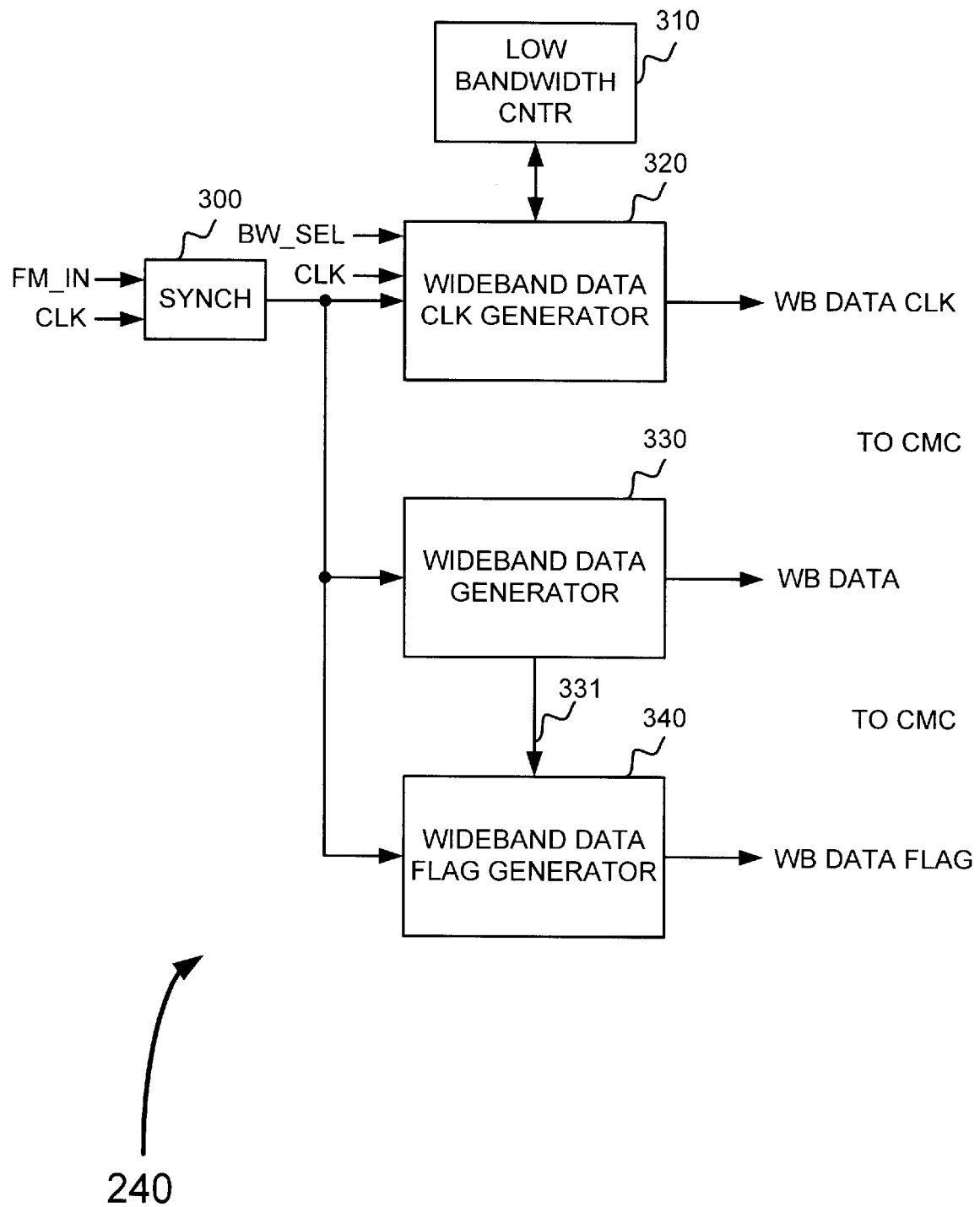
FIG. 3 is a block diagram representation of a wideband data demodulator of FIG. 2, in accordance with the first preferred embodiment of the present invention.

Refer now to FIG. 3 for a block diagram of the wideband data demodulator 240 of the AFE 18 (FIG. 2). Input into the wideband data demodulator 240 includes digitized and demodulated FM signals (FM_IN) from the NER 250 (FIG. 2) and a data clock (CLK) which is the system clock divided down to an appropriate operating frequency. Both FM_IN and CLK are input into a synch circuit 300. The synch circuit 300 gates the FM_IN signal and verifies that the FM_IN is aligned with the CLK input. The aligned FM_IN signal is transmitted to three different circuit blocks, a wideband data clock generator 320, a wideband data generator 330, and a wideband data flag generator 340. The wideband data generator 330 takes as its input the aligned FM_IN signal and decodes the data stream to produce wideband data. In addition to producing the actual wideband data, the wideband data generator 330 produces a QUALITY indicator 331 that is transmitted to the wideband data flag generator 340. The QUALITY indicator 331 is a function of the certainty that the wideband data generator 330 has in the correctness of the wideband data that it is generating. The QUALITY indicator 331 is transmitted to the wideband data flag generator 340. The wideband data flag) generator 340 uses the QUALITY indicator 331 and the aligned FM_IN signal to generate the WIDEBAND DATA FLAG that indicates whether the wideband data that is coming out of the wideband data generator 330 is valid.

The wideband data clock generator 320 receives as input the aligned FM_IN signal from the synch circuit 300 and a control signal/counter value pair from a low bandwidth counter 310. In this regard, the wideband data demodulator 240 is capable of operating in two modes, a low bandwidth mode and a high bandwidth mode. The low bandwidth counter 310 provides compensation to ensure proper wideband data clock generation when the wideband data demodulator 240 is operating in low bandwidth mode. Using, the aligned FM_IN signal and the control signal/counter value pair from the low bandwidth counter 310, the wideband data clock generator 320 venerates a wideband data clock which matches the transmission clock embedded in the wideband data prior to transmission.

Figure 4:
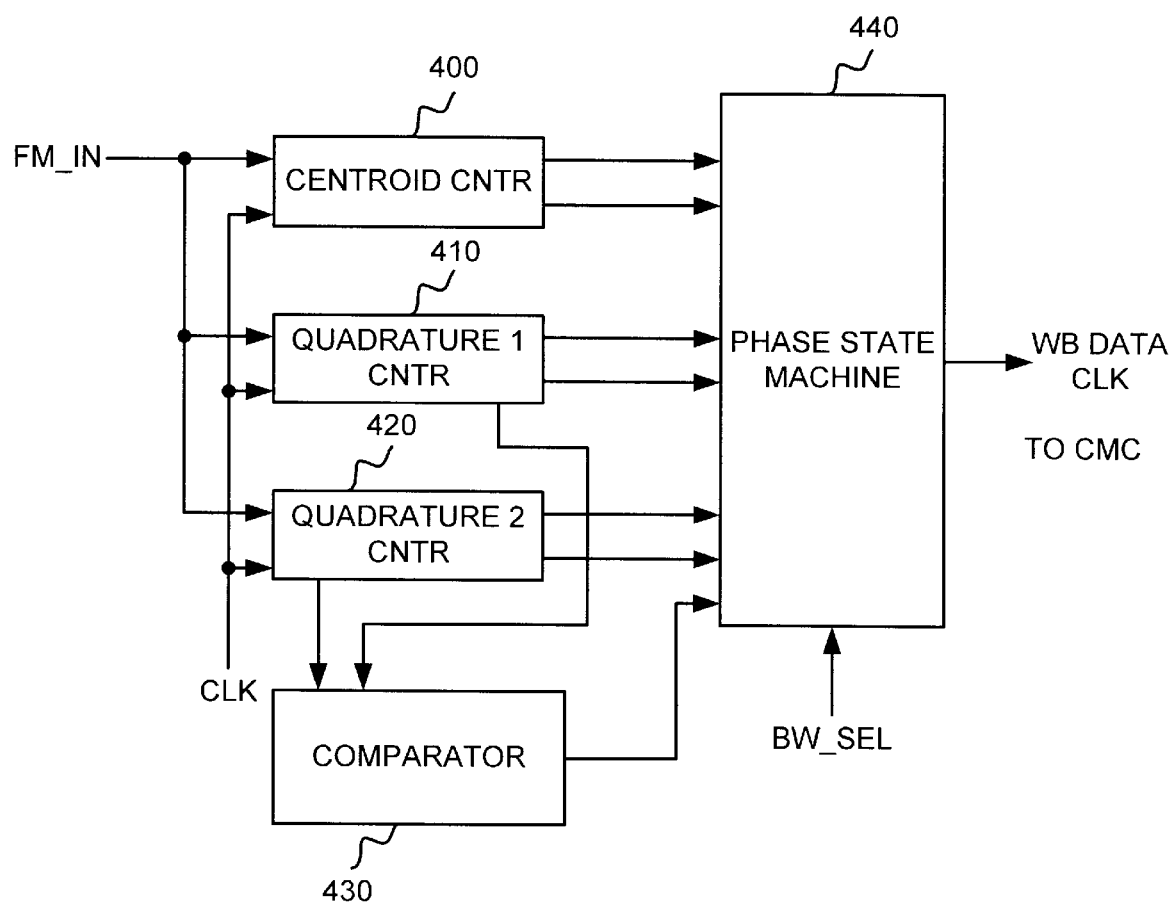
FIG. 4 is a block diagram representation of a wideband data clock generator circuit of FIG. 3 in accordance with the first preferred embodiment of the present invention.

Refer now to FIG. 4 for a block diagram of the wideband data clock generator 320 of the wideband data demodulator 240 (FIG. 3). Input into the wideband data clock generator 320 includes a digital wideband data stream (FM_IN), a system clock (CLK), and a bandwidth selector (BW_SEL). The CLK input provides timing information to the circuitry in the wideband data clock generator 320 while the BW_SEL input specifies the operating mode of the wideband data clock generator 390 either high or low bandwidth. The FM_IN data stream is transmitted to three binary counters a centroid counter 400, a quadrature 1 counter 410 and a quadrature 2 counter 420. Each counter is specified to count the value of the digital data stream during specific portions of a single data period. After performing their respective counts, the counters 400, 410, and 420 compare the values with a respective predetermined threshold. The predetermined threshold is preferably a value that represents approximately half of the number of FM_IN samples that each respective counter 400, 410, and 420 counts, and each COulltei 400, 410, and 420 preferably counts half of the samples in a data period.

For illustrative purposes, assume that there are thirty-two (32) samples for each data period, each counter 400, 410, and 420, therefore, counts sixteen (16) samples of the data period with a predetermined threshold of eight (8). Based on the result of the comparisons each counter will assert either a greater than line if the value is greater than eight (8), a less than line if the value is less than eight (8), or both lines if the value is equal to eight (8). A state machine 440 uses the data from the counters 400, 410, and 420 to perform adjustments to the timing and phase angle of the wideband data clock.

The centroid counter 400 counts the value of the digital data stream for the samples around the center of the single data period, i.e., around the expected position of the data transmission clock edge. The quadrature 1 counter 410 counts the value of the digital data stream for the samples immediately after the beginning of a single data period, while the quadrature 2 counter 420 counts the value of the digital data stream for the samples immediately after the center of the data period. According to the first preferred embodiment of the present invention, the quadrature 1 counter 410 begins its counting of the data samples several samples after the beginning of the data period, to help ensure the counting of the transition of the data transmission clock edge.

Figure 5:
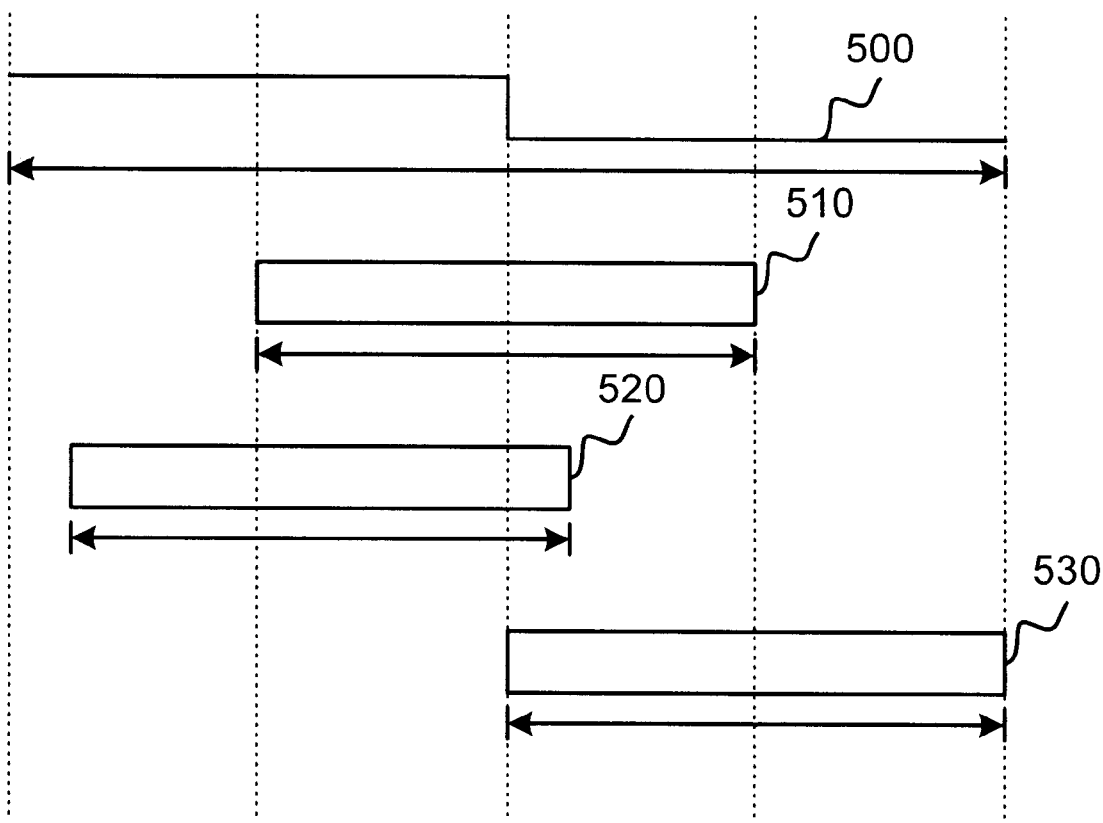
FIG. 5 is a diagram representing the relationship of counter windows and a received data signal, in accordance with the first preferred embodiment of the present invention.

Refer now to FIG. 5 for a diagram displaying the relationship between a single data period of the wideband data signal, the period of the centroid, quadrature 1 and quadrature 2 counters 400, 410, and 420 (all of FIG. 4). Trace 500 displays a typical data period, with a transition of the data transmission clock in the middle of the typical data period (divided into four quadrants). Window 510 displays a time window in which the centroid counter 400 (FIG. 4) will count the digital data samples, while time windows 520 and 530 display the time windows for the quadrature 1 and quadrature 2 counters 410 and 420 (both of FIG. 4), respectively. The relationship of the windows 510, 520, and 530 are fixed with respect to one another, however, the exact position between the windows 510, 520, and 530 and the data period trace 500, can change, depending on adjustments made to the wideband data clock generator 320 (FIG. 3). Referring back now to FIG. 4, the quadrature 1 counter 410 and the quadrature 2 counter 420 transmit their respective outputs to a comparator 430 in addition to transmitting their outputs to the state machine 440. The comparator 430 compares the values in the two counters, the quadrature 1 counter 410 and the quadrature 2 counter 420, and provides the results of the comparison to the state machine 440. After the state machine 440 receives the input from the three counters 400, 410, and 420, the comparator 430, and the BW_SEL, input, it executes a control process (not shown) to make adjustments to the timing and phase angle of the wideband data clock if necessary.

Figure 6:
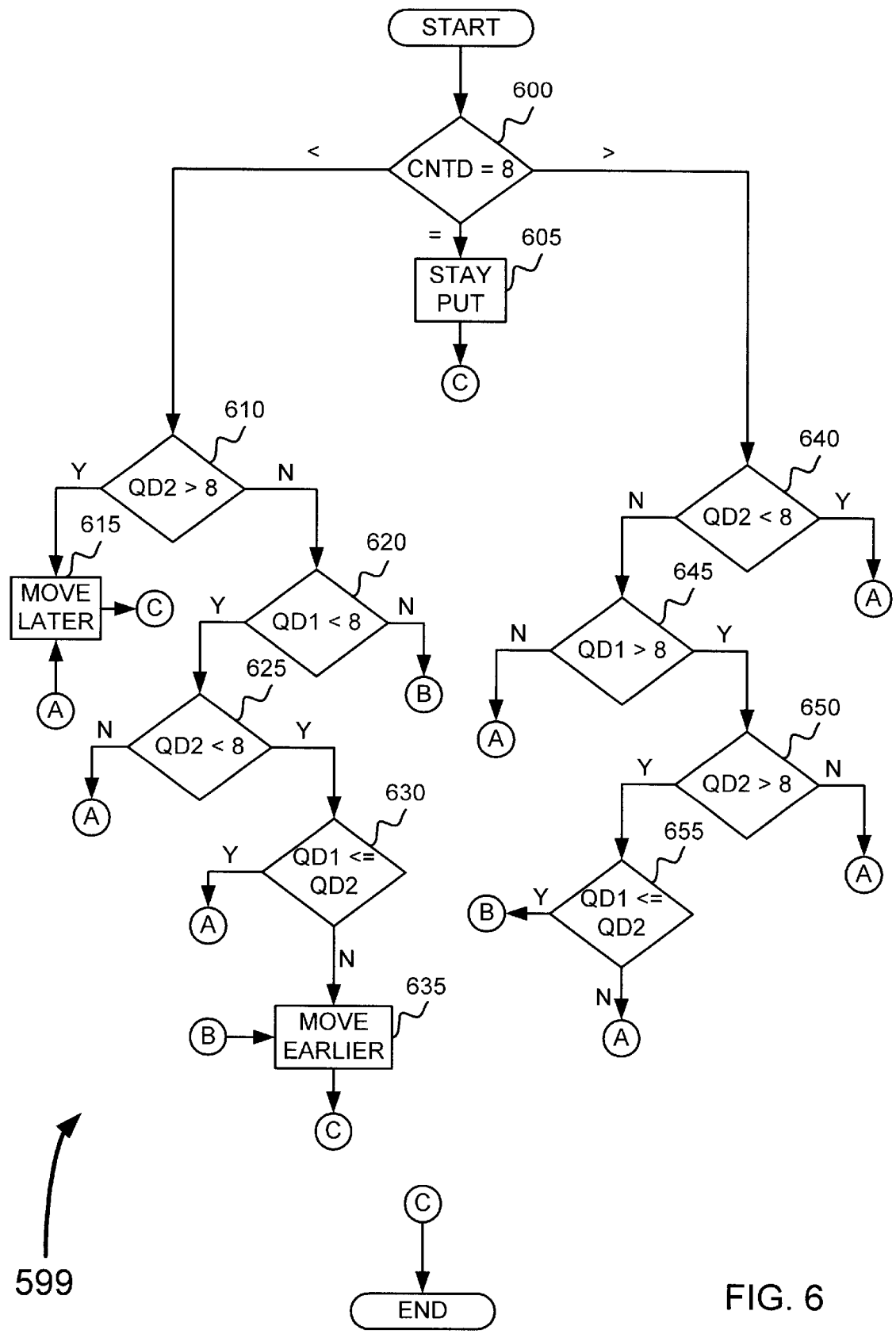
FIG. 6 is a flow diagram representing the structure of the process used to perform adjustments to the wideband data clock, in accordance with the present invention.

Refer now to FIG. 6 for a flow diagram 599 describing the state machine 440 (FIG. 4) for performing adjustments to the timing and phase angle of the wideband data clock. The state machine 440 (FIG. 4) executes once every wideband data period, after the three counters 400, 410, and 420 (all of FIG. 4) have completed their respective counts and comparisons. As stated previously, the state machine 440 (FIG. 4) receives input from the centroid counter 400 (FIG. 4). the quadrature 1 counter 410 (FIG. 4), the quadrature 2 counter 420 (FIG. 4), the comparator 430 (FIG. 4), and the BW_SEL input. Each of the three counters 400, 410, and 420 (all of FIG. 4) sends to the state machine 440 (FIG. 4) two control lines. If the value in the counter is greater than eight (8), the counter will assert the greater than control line, if the value in the counter is less than eight (8), the counter will assert the less than control line, and if the value in the counter is equal than eight (8), the counter will assert both control lines.

The state machine 440 (FIG. 4) starts in decision block 600 where it will check if the value counted in the centroid counter 400 (FIG. 4) is equal to the predetermined threshold of eight (8), for example. If the value in the centroid counter 400 (FIG. 4) is equal to eight (8), the state machine 440 (FIG. 4) makes no adjustments to the timing and phase antie of the wideband data clock (the stay put block 605) and stops execution. If the value in the centroid counter 400 (FIG. 4) is less than eight (8), the state machine 440 (FIG. 4) will also check the value in the quadrature 2 counter 420 (FIG. 4) in decision block 610. If the value in the quadrature 2 counter 420 (FIG. 4) is greater than eight (8), the state machine 440 (FIG. 4) adjusts the timing and phase angle of the wideband data clock one sampling time period later and stops execution as indicated in block 615. The adjustment of the timing and phase angle of the wideband data clock is performed by moving the position of the three counters 400, 410, and 420 (all of FIG. 4), or example, by moving the position of the counters 400, 410, and 420 (all of FIG. 4) back one sampling time period, the wideband data clock which is generated from data provided by the counters is moved back one sampling time period in time. In the first preferred embodiment of the present invention, each wideband data period is sampled thirty two (32) times, hence the wideband data clock generator 320 (FIG. 4) can fine-tune the timing and phase angle of the wideband data clock 1/32th of a period at a time. If the value in the quadrature 2 counter 420 (FIG. 4) is not greater than eight (8), the state machine 440 (FIG. 4) will check the value of the quadrature 1 counter 410 (FIG. 4) in decision block 620. If the value in the quadrature 1 counter 410 (FIG. 4) is not less than eight (8), the state machine 440 (FIG. 4) will adjust the timing and phase angle of the wideband data clock one sampling time period earlier and stops execution as indicated by block 635. If the value in the quadrature 1 counter 410 (IFIG. 4) is less than eight (8) the state machine 440 (FIG. 4) will check if the value in the quadrature 2 counter 420 (FIG. 4) is less than eight (8) in decision block 625. If the value in the quadrature 2 counter 420 (FIG. 4) is not less than eight (8), the state machine 440 (FIG. 4) will adjust the timing and phase angle of the wideband data clock one sampling time period later and stops execution. If the value in the quadrature 2 counter 420 (FIG. 4) is less than eight (8), then the state machine 440 (FIG. 4) will check the two values counted by the quadrature 1 counter 410 (FIG. 4) and the quadrature 2 counter 420 (FIG. 4) in decision block 630. The actual comparison of the two values is performed by the comparator 430 (FIG. 4) and the result forwarded to the state machine 440 (FIG. 4). If the quadrature 1 counter 410 (FIG. 4) value is less than or equal to the quadrature 2 counter 420 (FIG. 4) value, the state machine 440 (FIG. 4) will adjust the timing and phase angle of the wideband data clock one sampling period later and stop execution. If the quadrature 1 counter 410 (FIG. 1) value is greater than the quadrature 2 counter 420 (FIG. 4) value, the state machine 440 (FIG. 4) will adjust the timing and phase angle of the wideband data clock one sampling period earlier and stops execution.

If, in decision block 600, the value in the centroid counter 400 (FIG. 4) is greater than eight (8), then the state machine 440 (FIG. 4) will check the value in the quadrature 1 counter 420 (FIG. 4) in decision block 640. If the value in the quadrature 2 counter 420 (FIG. 4) is less than eight (8), the state machine 440 (FIG. 4) adjusts the timing and phase angle of the wideband data clock one sampling time period later and stops execution. If the value in the quadrature 2 counter 420 (FIG. 4) is not less than eight (8), the state machine 440 (FIG. 4) will check the value of the quadrature 1 counter 410 (FIG. 4) in decision block 645. If the value in the quadrature 1 counter is not (greater than eight (8), the state machine 440 (FIG. 4) will adjust the timing and phase angle of the wideband data clock one sampling time period later and stop execution. If the value in the quadrature 1 counter is greater than eight (8), the state machine 440 (FIG. 4) will check if the value in the quadrature 2 counter 420 (FIG. 4) is greater than eight (8) in decision block 650. If the value in the quadrature 2 counter 420 (EIG. 4) is not greater than eight (8), the state machine 440 (FIG. 4) will adjust the timing and phase angle of the wideband data clock one sampling time period later and stop execution. If the value in the quadrature 2 counter 420 (FIG. 4) is greater than eight (8), then the state machine 440 (FIG. 4) will check the two values counted by the quadrature 1 counter 410 (FIG. 4) and the quadrature 2 counter 420 (FIG. 4) in decision block 655, as forwarded to the state machine 440 (FIG. 4) from the comparator 430 (FIG. 4). If the quadrature 1 counter 410 (FIG. 1) value is less than or equal to the quadrature 2 counter 420 (FIG. 4) value, the state machine 440 (FIG. 4) will adjust the timing and phase angle of the wideband data clock one sampling period earlier and stop execution. If the quadrature 1 counter 410 (FIG. 1) value is greater than the quadrature 2 counter 420 (FIG. 4) value, the state machine 440 (FIG. 4) will adjust the timing and phase angle of the wideband data clock one sampling period later and stop execution.

Figure 7:
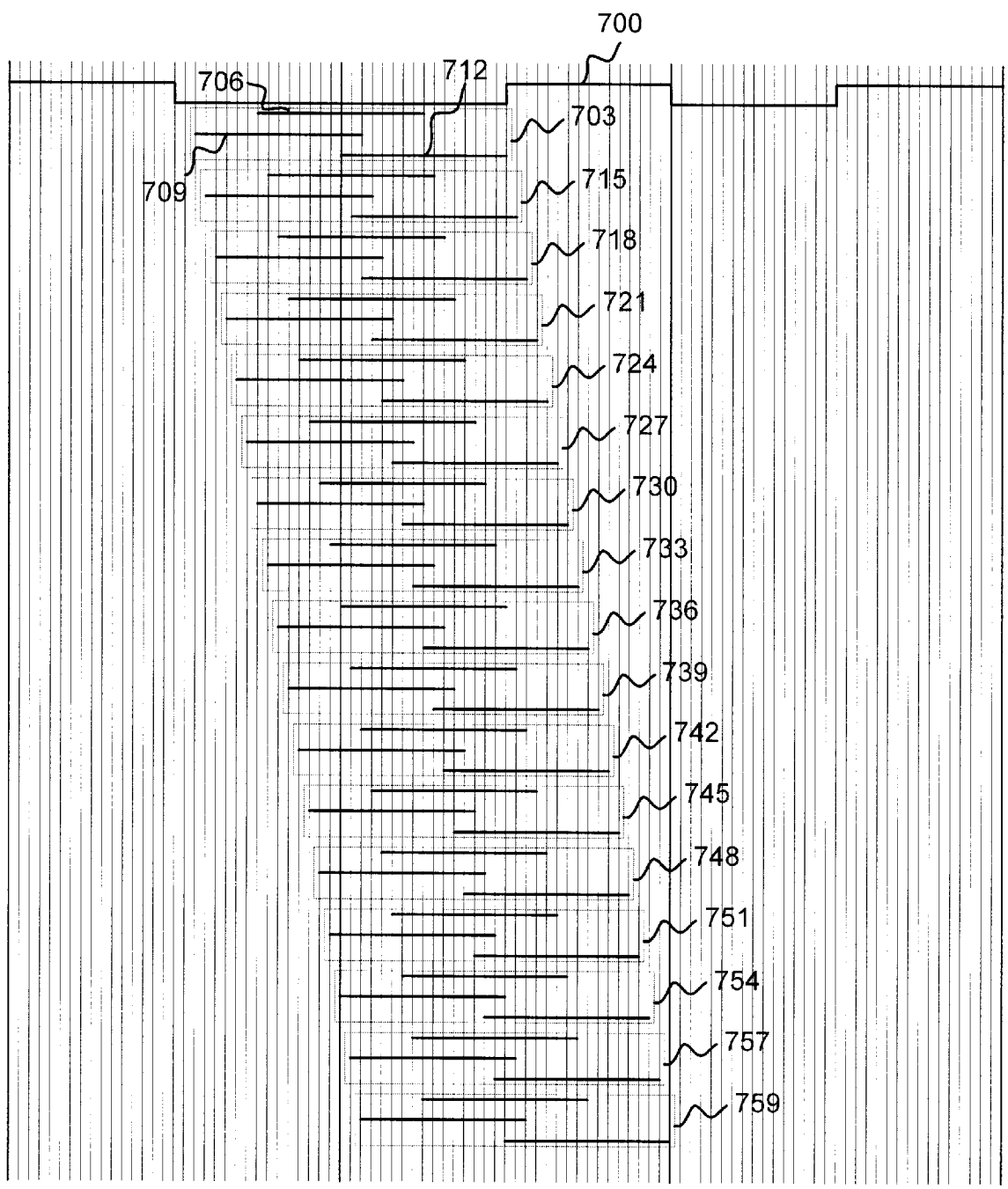
FIG. 7 is a diagram representing the timing and phase angle adjustments performed by the wideband data clock generator of the wideband data demodulator of FIG. 2, in accordance with the first preferred embodiment of the present invention.

Refer now to FIG. 7 for a diagram displaying example timing and phase angle adjustments performed by the wideband data clock generator 320 (FIG. 4), according to the first preferred embodiment of the present invention. A trace 700 displays a sample Manchester Encoded digital wideband data input stream as it enters the wideband data demodulator 240 (FIG. 3) A grouping of three traces 703 displays the portion of the wideband data input stream that the three counters 400, 410, and 420 (all of FIG. 4) are counting. Trace 706 displays the portion counted by the centroid counter 400 (FIG. 4), and traces 709 and 712 display the portions counted by the quadrature 1 counter 410 (FIG. 4) and quadrature 2 counter 420 (FIG. 4), respectively. The grouping 703 displays a possible initial position of the counters 400, 410, and 420 (all of FIG. 4) and hence the wideband data clock. With the position of the counters as shown in trace 706, the values of the counters are as follows: centroid counter=0, quadrature 1 counter=0, and quadrature 2 counter=0. The state machine 440 (FIG. 4) executing an algorithm described by the flow diagram 599 (FIG. 5) and the count values from the counters 400, 410, and 420 (all of FIG. 4) will adjust the timing and phase angle of the wideband data clock one sample period later, as displayed in grouping 715.

With the position of the counters as shown in trace 715, the values of the counters are as follows: centroid counter=0, quadrature 1 counter=0, and quadrature 2 counter=1. In the next data period, using, the count values from the counters 400, 410, and 420 (all of FIG. 4), the state machine 440 (FIG. 4) will once again adjust the timing and phase angle of the wideband data clock one sample period later, as displayed in grouping 718. With the position of the counters as shown in trace 718, the values of the counters are as follows: centroid counter=0, quadrature 1 counter=0, and quadrature 2 counter=2. The adjustment of the of the timing and phase angle of the wideband data clock continues in a similar manner for groupings 721–757. 1however, the value of the centroid counter 400 (FIG. 4), when the position of the counters 400, 410, and 420 (all of FIG. 4) are as shown in group 759, is equal to eight (8). Therefore, the execution of the algorithm as described by the flow diagram 599 (FIG. 5) will immediately drop to block 605, the stay put block. This implies that the wideband data clock is properly adjusted with respect to the wideband data input stream and no further adjustments need to be performed.

While the embodiments of the present invention which have been disclosed herein are the preferred forms, other embodiments of the method and apparatus of the present invention will suggest themselves to persons skilled in the art in view of this disclosure. Therefore, it will be understood that variations and modifications can be effected within the spirit and scope of the invention and that the scope of the present invention should only be limited by the claims below. Furthermore, the corresponding structures, materials, acts, and equivalents of any means- or step-plus-functioning elements in the claims below are hereby described to include any structures material or acts for performing the claimed functions in combination with other claimed elements as specifically claimed.

I claim:

1. A system for adjusting a phase angle of a clock signal, comprising:

a plurality of counters, each of said plurality of counters configured to determine a number of samples having a particular logical value within a portion of a period of a data signal and configured to transmit a comparison signal indicating a comparison of said number to a predetermined threshold value, wherein said each of said plurality of counters corresponds to a different portion of said period, wherein said comparison signal indicates whether said number exceeds said predetermined threshold value, and wherein said number of samples located in said portion of said period corresponds to approximately one-half of a number of samples within said period; and a phase state machine configured to receive said comparison signals from said plurality of counters and to adjust said phase angle of said clock signal based on said comparison signals.

2. A method for adjusting a phase angle of a clock signal, comprising the steps of:

determining a number of samples having a particular logical value within each of a plurality of different portions of a data signal period;

comparing said number from said each of said plurality of different portions to a predetermined threshold value, wherein said predetermined threshold value corresponds to one-half of a total number of samples located in said each of said plurality of different portions, and wherein said total number of samples corresponds to one-half of a number of samples within said data signal period; and adjusting said phase angle of said clock signal based on said comparing step.

3. A system for adjusting a phase angle of a clock signal, comprising:

means for determining a number of samples having a particular logical value within each of a plurality of different portions of a data signal period;

means for comparing said number from said each of said plurality of different portions to a predetermined threshold value, wherein said predetermined threshold value corresponds to one-half of a total number of samples located in said each of said plurality of different portions, wherein said total number of samples corresponds to one-half of a number of samples within said data signal period; and means for adjusting said phase angle of said clock signal based on said comparing step.

4. A system for adjusting a phase angle of a recovered data clock signal from a received data signal, comprising:

a digital sampler for sampling said received data signal;

a first counter configured to count a first number of samples of said received data signal having a particular logical value within a first portion of a period of said received data signal and configured to transmit a first signal indicating whether said first number exceeds a first predetermined threshold number;

a second counter configured to count a second number of samples of said received data signal having said particular logical value within a second portion of said period of said received data signal and configured to transmit a second signal indicating whether said second number exceeds a second predetermined threshold number;

a third counter configured to count a third number of samples of said received data signal having said particular logical value within a third portion of said period of said received data signal and configured to transmit a third signal indicating whether said third number exceeds a third predetermined threshold number wherein said first portion of said period is located within a center portion of said period wherein said second portion of said period includes samples detected before a detection of samples included in said first portion of said period, and wherein said third portion of said period includes samples detected after said detection of samples included in said first portion of said period, wherein said first portion of said period, said second portion of said period, and said third portion of said period include a number of samples corresponding to one-half of a total number of samples in said period; and a phase state machine configured to receive said first signal said second signal, and said third signal and configured to adjust said phase angle based on said first signal, said second signal and said third signal.

5. A system for adjusting a phase angle of a recovered data clock signal from a received data signal, comprising:

a digital sampler for sampling said received data signal;

a first counter configured to count a first number of samples of said received data signal having a particular logical value within a first portion of a period of said received data signal and configured to transmit a first signal indicating whether said first number exceeds a first predetermined threshold number;

a second counter configured to count a second number of samples of said received data signal having said particular logical value within a second portion of said period of said received data signal and configured to transmit a second signal indicating whether said second number exceeds a second predetermined threshold number;

a third counter configured to count a third number of samples of said received data signal having said particular logical value within a third portion of said period of said received data signal and configured to transmit a third signal indicating whether said third number exceeds a third predetermined threshold number, wherein said first portion of said period is located within a center portion of said period, wherein said second portion of said period includes samples detected before a detection of samples included in said first portion of said period and wherein said third portion of said period includes samples detected after said detection of samples included in said first portion of said period, wherein said first portion of said period partially overlaps with second portion and said third portion of said period; and a phase state machine configured to receive said first signal, said second signal, and said third signal and configured to adjust said phase angle based on said first signal, said second signal, and said third signal.

6. The system of claim 4, wherein said first, second, and third predetermined threshold numbers correspond to approximately one-fourth of said total number of samples in said period.

7. The system of claim 5, wherein said second portion and said third portion of said period partially overlap.

8. The system of claim 5, wherein said second portion and said third portion of said period do not overlap.

9. A method for adjusting a time and phase angle of a recovered data clock signal, comprising the steps of:

receiving a data signal having a period;

counting a first number of samples having a particular logical value within a first portion of said period;

counting a second number of samples having said particular logical value within a second portion of said period;

counting a third number of samples having said particular logical value within a third portion of said period, wherein said first portion of said period is located within a center portion of said period, wherein said second portion of said period includes samples detected before a detection of samples included in said first portion of said period, and wherein said third portion of said period includes samples detected after said detection of samples included in said first portion of said period, wherein said first portion of said period, said second portion of said period, and said third portion of said period include a number of samples corresponding to one-half of a total number of samples in said period of said received data signal;

comparing said first number to a first predetermined threshold;

comparing said second number to a second predetermined threshold;

comparing said third number to a third predetermined threshold; and adjusting said time and phase angle of said recovered data clock signal based on said comparing steps.

10. A method for adjusting a time and phase angle of a recovered data clock signal comprising the steps of:

receiving a data signal having a period;

counting a first number of samples having a particular logical value within a first portion of said period;

counting a second number of samples having said particular logical value within a second portion of said period;

counting a third number of samples having said particular logical value within a third portion of said period, wherein said first portion of said period is located within a center portion of said period, wherein said second portion of said period includes samples detected before a detection of samples included in said first portion of said period, and wherein said third portion of said period includes samples detected after said detection of samples included in said first portion of said period, wherein said first portion of said period partially overlaps with said second portion and said third portion of said period;

comparing said first number to a first predetermined threshold;

comparing said second number to a second predetermined threshold;

comparing said third number to a third predetermined threshold; and adjusting said time and phase angle of said recovered data clock signal based on said comparing steps.

11. The method of claim 9, wherein said first, second, and third predetermined thresholds correspond to approximately one-fourth of said total number.

12. The method of claim 10, wherein said second portion and said third portion of said period partially overlap.

13. The method of claim 10, wherein said second portion and said third portion of said period do not overlap.

14. A system for adjusting a time and phase angle of a recovered data clock signal, comprising:

means for receiving a data signal having a period;

means for counting a first number of samples having a particular logical value within a first portion of said period;

means for counting a second number of samples having said particular logical value within a second portion of said period;

means for counting a third number of samples having said particular logical value within a third portion of said period, wherein said first portion of said period is located within a center portion of said period, wherein said second portion of said period includes samples detected before a detection of samples included in said first portion of said period, and wherein said third portion of said period includes samples detected after said detection of samples included in said first portion of said period, and wherein said first portion of said period, said second portion of said period, and said third portion of said period include a number of samples corresponding to one-half of a total number of samples in said period of said received data signal;

means for comparing said first number to a first predetermined threshold;

means for comparing said second number to a second predetermined threshold;

means for comparing said third number to a third predetermined threshold; and means for adjusting said time and phase angle of said recovered data clock signal based on said comparing steps.

15. A system for adjusting a time and phase angle of a recovered data clock signal, comprising:

means for receiving a data signal having a period;

means for counting a first number of samples having a particular logical value within a first portion of said period;

means for counting a second number of samples having said particular logical value within a second portion of said period;

means for counting a third number of samples having said particular logical value within a third portion of said period, wherein said first portion of said period is located within a center portion of said period, wherein said second portion of said period includes samples detected before a detection of samples included in said first portion of said period, and wherein said third portion of said period includes samples detected after said detection of samples included in said first portion of said period, and wherein said first portion of said period, said second portion of said period, and said third portion of said period include a number of samples corresponding to one-half of a total number of samples in said period of said received data signal;

means for comparing said first number to a first predetermined threshold;

means for comparing said second number to a second predetermined threshold;

means for comparing said third number to a third predetermined threshold; and means for adjusting said time and phase angle of said recovered data clock signal based on said comparing steps.

16. The system of claim 14, wherein said first, second, and third predetermined thresholds correspond to approximately one-fourth of said total number.

17. The system of claim 15, wherein said second portion and said third portion of said period partially overlap.

18. The system of claim 15, wherein said second portion and said third portion of said period do not overlap.

* * * * *